ary fluid is circulated from the core to the steam generator and then back to the core again. Because the steam generator is within the pressure vessel its height is limited and it is therefore difficult to obtain a good quality steam without passing it several times in heating contact with the primary fluid.

In accordance with the invention there is provided a steam generator in which the heating surface comprises a number of similar once-through tube clusters exposed to a heating fluid, each cluster including a number of tubes extending between headers and assembled into a multipass arrangement within the cluster, so that water can be fed to the clusters and removed as superheated steam.

A steam generator having its heating surface planned in this way gives superheated steam in the limited height ordinarily available in the pressure vessel, with single once-through flow: that is to say it is not necessary to provide separate tube banks for preheating, evaporating and superheating or to cause the water and steam to flow through a succession of different flow paths in different tube banks. This steam generator can be used in other applications besides integrated nuclear steam generator systems.

In the preferred arrangement, each tube cluster is a three-pass cluster, with preheating, evaporating and superheating, respectively, taking place in the three passes.

Each tube cluster may comprise a number of straight tubes which are welded between small headers. The cross-sectional shape of each cluster may, with advantage, be hexagonal so that the clusters can be arranged side by side to form a honeycomb pattern, although other regular or irregular polygonal cross-sectional shapes are possible. The best cross-sectional shape is usually that which enables a maximum number of clusters to be fitted within the annular chamber so as to provide the largest possible surface. Also the tubes should be spaced as uniformly as possible over the cross-sectional area of the generator.

In one advantageous arrangement, the tube cluster comprises a central tube down which the feed water is directed. The feed water is preheated in this tube but is preferably not raised to boiling temperature so as to avoid difficulties with boiling since the water is being fed downwardly. Upon emerging from this tube the water is directed by a flow divider upwardly through a number of evaporator tubes surrounding the central tube. In these evaporator tubes the water is heated to boiling and evaporated, although complete evaporation is usually not achieved in these tubes and the steam emerging from them is still slightly wet. This wet steam is then directed downwardly through superheater tubes surrounding, or at least partially surrounding, the evaporator tubes and in these superheater tubes complete evaporation is achieved and the steam is superheated. The relative numbers of evaporator and superheater tubes is chosen so as to give the optimum heat transfer in any particular design.

An example of a steam generator in accordance with the invention will now be described with reference to the accompanying drawings in which.

Figure 1:
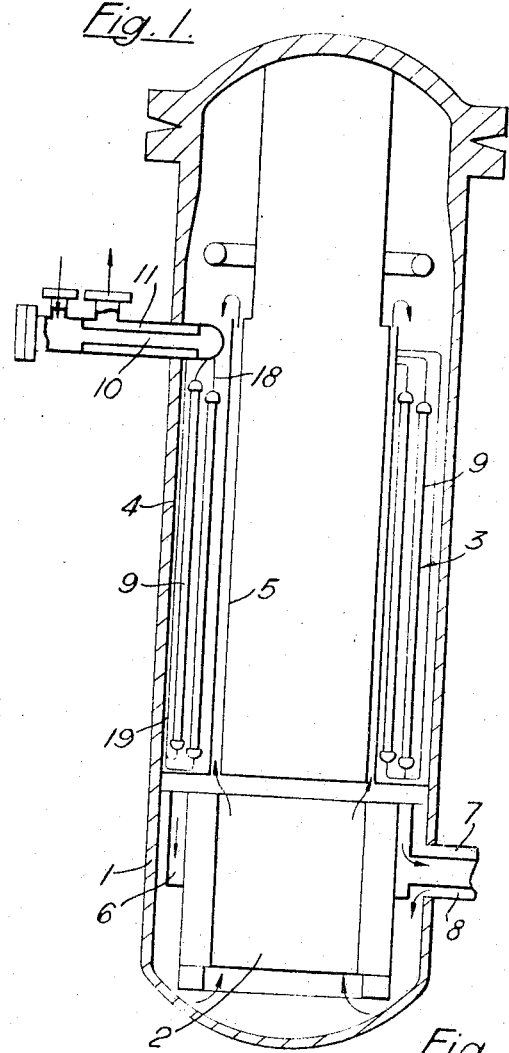
FIGURE 1 is a longitudinal axial section through an integrated nuclear reactor steam generator system.

The integrated nuclear reactor steam generator system shown in FIGURE 1 comprises an upright cylindrical pressure vessel 1 containing a core 2 and a steam generator 3. The steam generator is positioned within an annular chamber 4 in the vessel. Primary fluid is circulated through the core 2, upwardly through an inner annular chamber 5, downwardly through the annular chamber 4, and is then collected in a lower annular chamber 6. From this chamber 6 the primary fluid is withdrawn through a tube 7 passing out of the pressure vessel 1, fed to a circulating pump (not shown), and then returned to the core 2 through a tube 8 concentrically surrounding the tube 7.

The steam generator 3 comprises a number of tube clusters 9 which are fed with feed water from an inlet tube 10, and from which superheated steam is withdrawn through an outlet tube 11 concentrically surrounding the tube 10. By providing concentric inlet and outlet tubes the steam generator only requires a single hole to be made in the pressure vessel 1.

Figure 2:
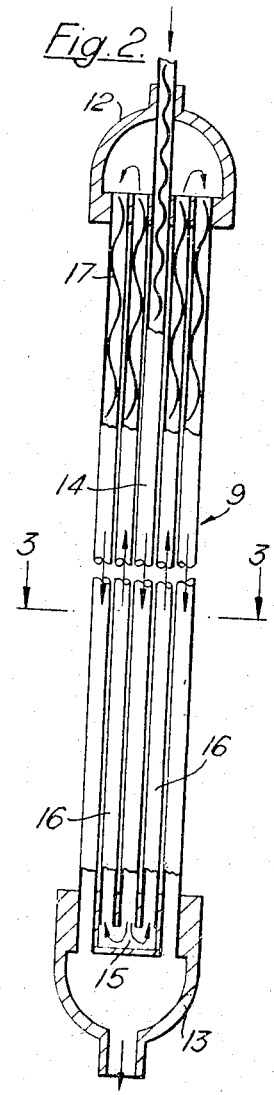
FIGURE 2 is a longitudinal axial section through a tube cluster of the steam generator.
Figure 3:
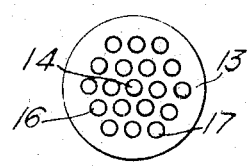
FIGURE 3 is a section taken on the line 3—3 of FIGURE 2.

As best shown in FIGURES 2 and 3 each tube cluster 9 comprises a number of upright straight tubes welded between an upper header 12 and a lower header 13. Each cluster has a central preheater tube 14 which passes through the upper header 12 and which is connected to the lower header 13. The central tube communicates with a chamber 15 in the lower header 13 and this chamber 15 is arranged to direct the flow of heated water from the tube 14 into evaporator tubes 16 which also communicate with the chamber 15. In the steam generator shown in the drawings, twelve evaporator tubes 16 are provided and these surround the central tube 14. The evaporator tubes 16 communicate with the upper header 12 and also leading from the upper header 12 are superheater tubes 17. Six superheater tubes 17 are provided in the steam generator shown in the drawings and at their lower ends these tubes 17 communicate with the lower header 13.

The feed water is led to each cluster 9 through inlet tubes 18 communicating with the tubes 10 and 14 and superheated steam is removed from the lower headers 13 by tubes 19 which communicate with the outlet tube 11.

As best shown in FIGURE 3 the cross-sectional arrangement of the tubes 14, 16 and 17 is hexagonal, and it will be appreciated that this cross-sectional shape allows the clusters 9 to be arranged side by side to form a honeycomb structure. In this way a relatively large heating surface is provided in a relatively small space.

Each of the tubes 14, 16 and 17 has an inner spiral turbulator so as to give a better heat transfer between the heating fluid and the water or steam.

In operation the primary fluid is heated in the core and is then circulated past the tubes 14, 16 and 17 where it is cooled. It is then recirculated so as to be reheated in the core. Feed water is fed to the tube clusters 9 through the inlet tubes 10 and 18 and the feed water passes downwardly through the central tube 14. In this tube the water is arranged for example, to pass at such a rate that it is not at its boiling temperature when it reaches the chamber 15. In this way difficulties arising from the boiling of a downwardly flowing liquid are not encountered. The preheated water then passes upwardly through the tubes 16 in which the major part of it is evaporated. The steam is still, however, slightly wet when it passes into the upper header 12. This wet steam then passes downwardly through the tubes 17 in which complete evaporation of the water and then superheating of the steam are achieved. The tubes 17 feed the superheated steam into the lower header 13 from whence it is removed through the outlet tubes 19 and 11.

In order to overcome, or at least reduce, flow instability in the tube clusters, each perheater tube 14 is provided with a spiral turbulator which is more closely wound than is necessary simply for heat transfer. This provides a relatively large pressure drop and thus reduces the influence of any uneven flow distribution occurring between clusters. Also the presence of the upper header 12 reduces any flow instability arising through oscillations produced by the boiling in the evaporator tubes 16, since in this header such vibrations are taken up or buffered.

We claim:

1. A steam generator comprising a cluster of once-through tubes the external surfaces of which are exposed to a heating fluid and including an upper header and a lower header, said lower header including a first chamber and a second chamber, means including at least one of said tubes for feeding water to the said first chamber, at least some of said tubes of said cluster being evaporator tubes extending from said first chamber to said upper header wherein water evaporates as it passes upwardly through said evaporator tubes from said first chamber to said upper header, and at least some of said tubes of said cluster being superheater tubes extending from said upper header to said second chamber wherein the water evaporated in the said evaporating tubes is superheated as it passes downwardly through said superheater tubes from said upper header to said second chamber, and an outlet for superheated steam connected to said second chamber.

2. A steam generator according to claim 1, in which the said tube included in the means for feeding water to the said first chamber comprises a preheater tube extending through the upper header and externally of the evaporator and superheater tubes to the said first chamber, and wherein feedwater passes downwardly through said preheater tube to said first chamber.

3. A steam generator according to claim 2 in which the said tubes are arranged in a bundle and wherein a single preheater tube occupies a central position in said bundle, and said evaporator and superheater tubes are disposed about said preheater tube, said superheater tubes occupying positions at the outer periphery of the bundle.

4. An integrated nuclear reactor including a pressure vessel having mounted therein a core, a steam generating system and a means for circulating a primary coolant from said core to said steam generating system, said steam generating system including a plurality of similar once-through tube clusters exposed to said primary coolant, each of said clusters including an upper header and a lower header, said lower header including a first chamber and a second chamber, means including at least one of said tubes for feeding water to the said first chamber, at least some of said tubes of said cluster being evaporator tubes extending from said first chamber to said upper header wherein water evaporates as it passes upwardly through said evaporator tubes from said first chamber to said upper header, and at least some of said tubes of said cluster being superheater tubes extending from said upper header to said second chamber wherein the water evaporated in the said evaporating tubes is superheated as it passes downwardly through said superheater tubes from said upper header to said second chamber, and an outlet for superheated steam connected to said second chamber.

5. A generator according to claim 1, in which each tube has a spiral turbulator within it.

6. A generator according to claim 1, in which the cross-sectional shape of the cluster is hexagonal.

References Cited

UNITED STATES PATENTS

| 3,018,764 | 1/1962 | Huet | 122—34 |
| 3,097,630 | 7/1963 | Kinyon et al. | 122—34 |
| 3,104,652 | 9/1963 | Tillequin et al. | 122—32 |
| 3,195,517 | 7/1965 | Bell | 122—406 |
| 3,267,907 | 8/1966 | Glausser et al. | 122—34 |

FOREIGN PATENTS

| 865,997 | 4/1961 | Great Britain. |

KENNETH W. SPRAGUE, *Primary Examiner.*